W. L. McGRATH.
ENGINE STARTER.
APPLICATION FILED AUG. 22, 1917.
1,288,086.
Patented Dec. 17, 1918.
6 SHEETS—SHEET 2.
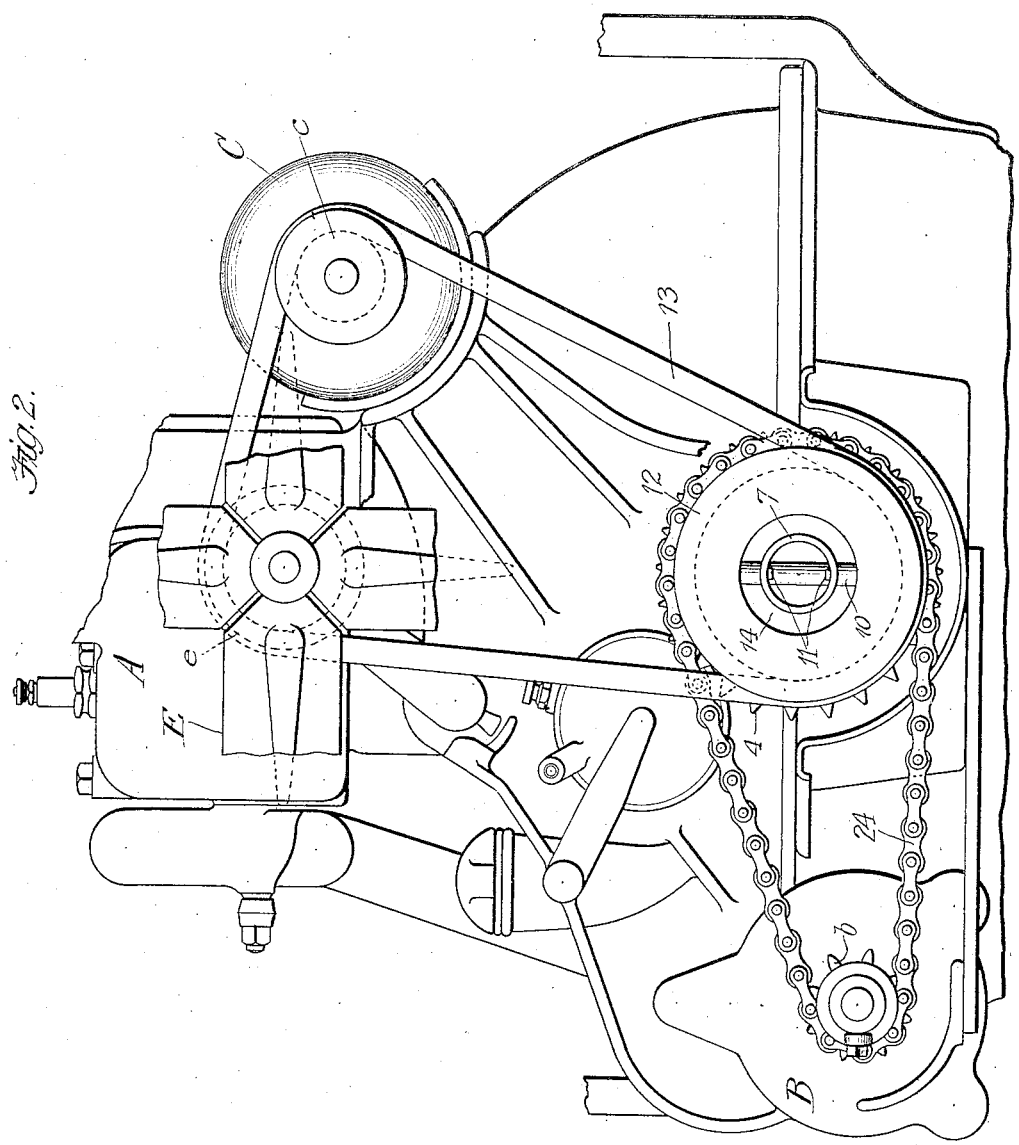

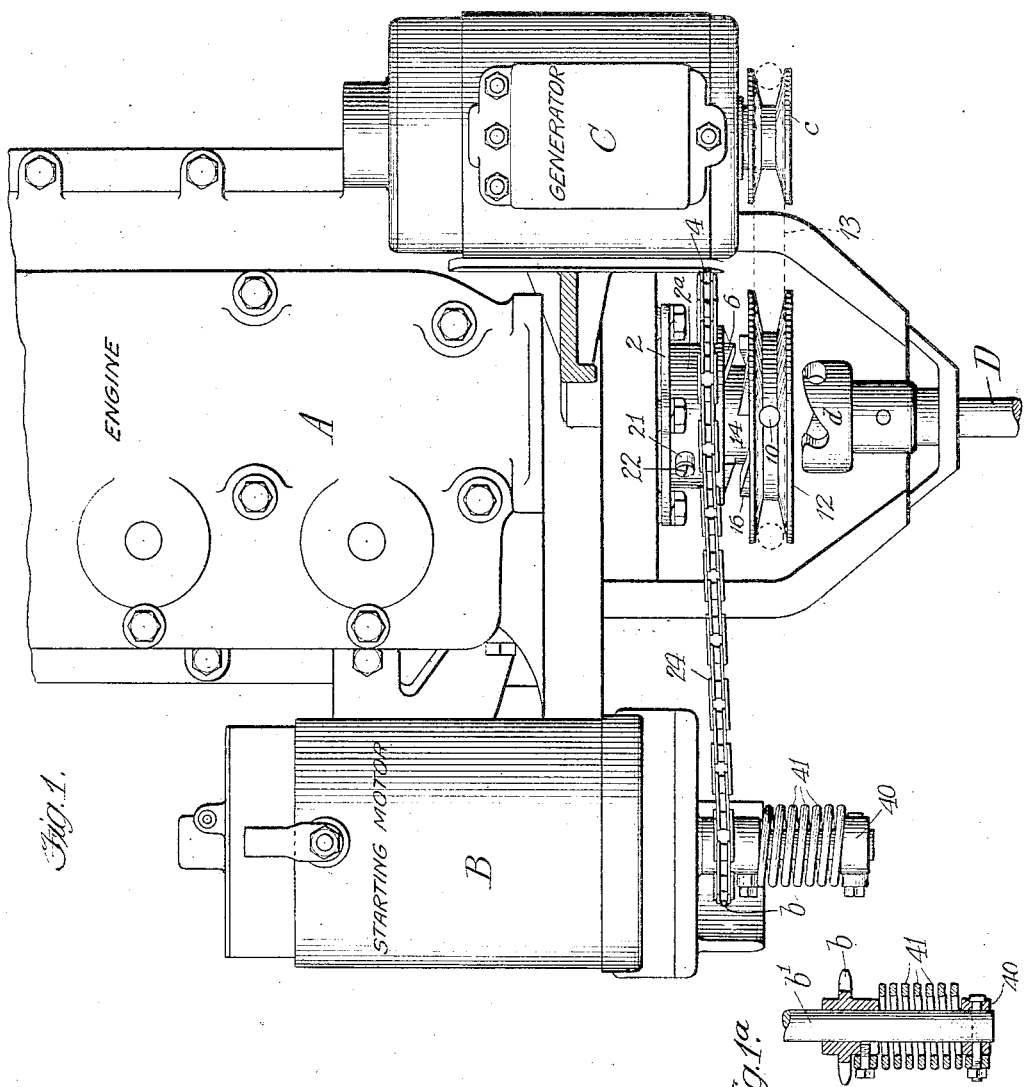

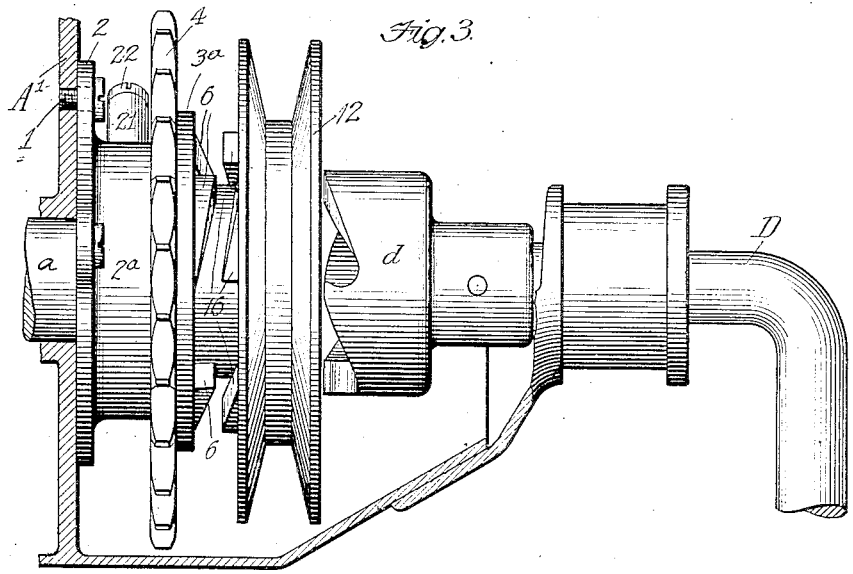
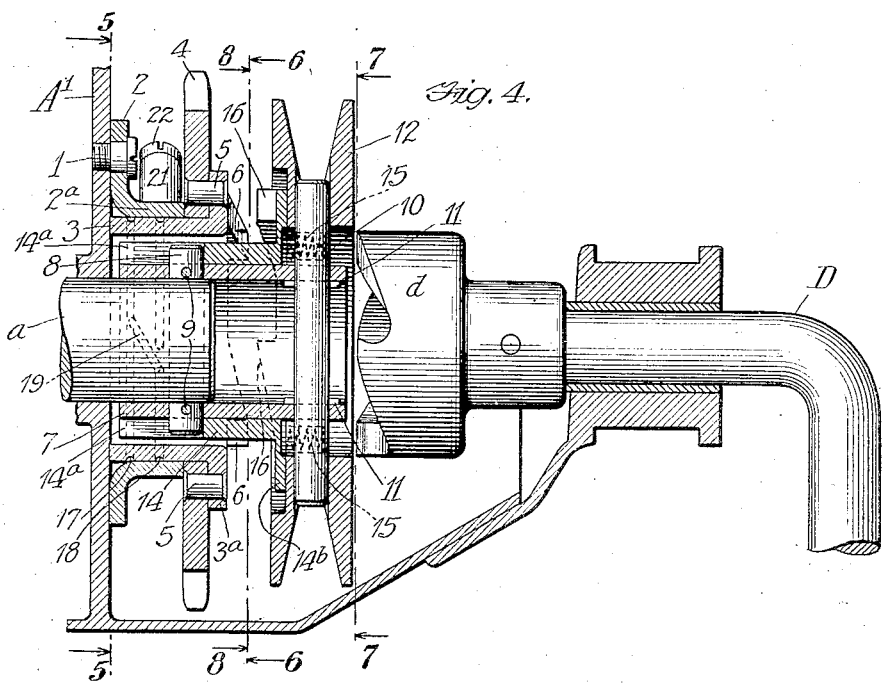

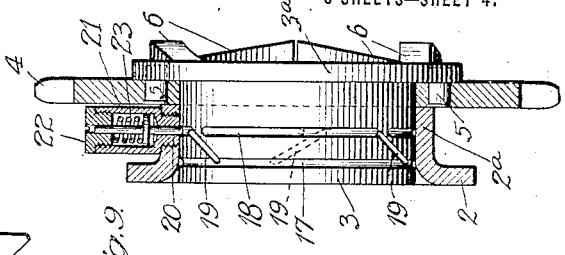
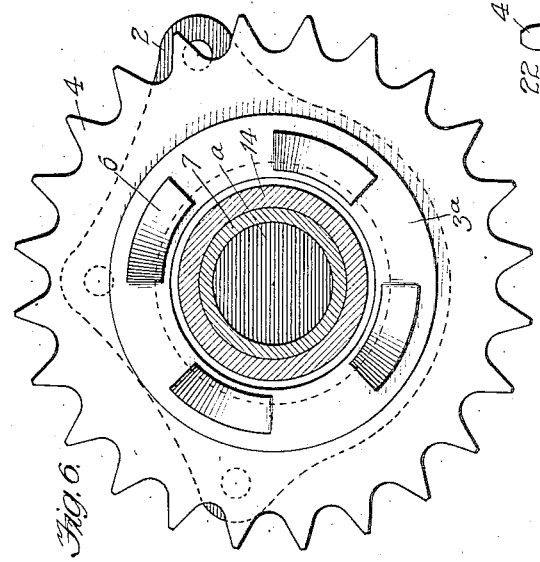
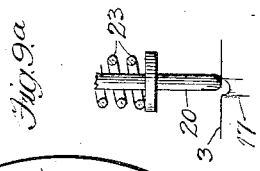
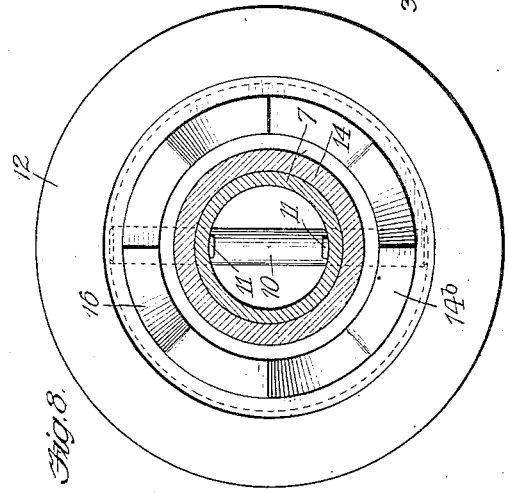
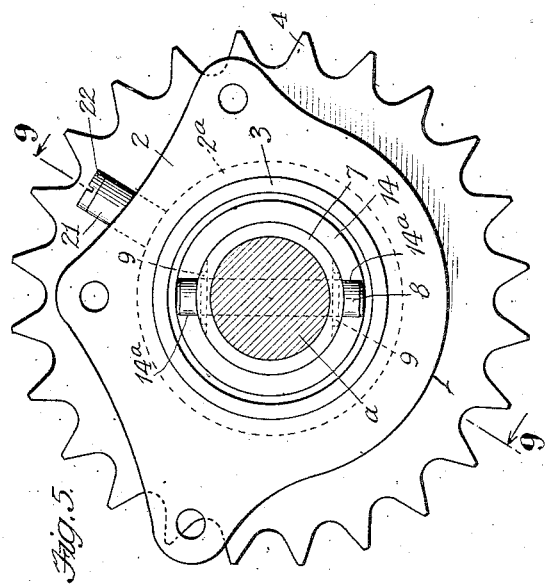
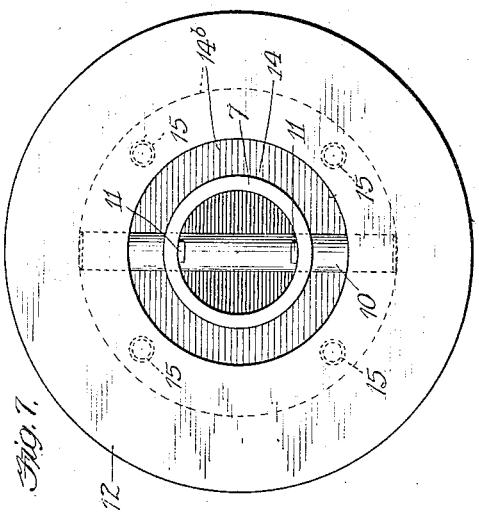

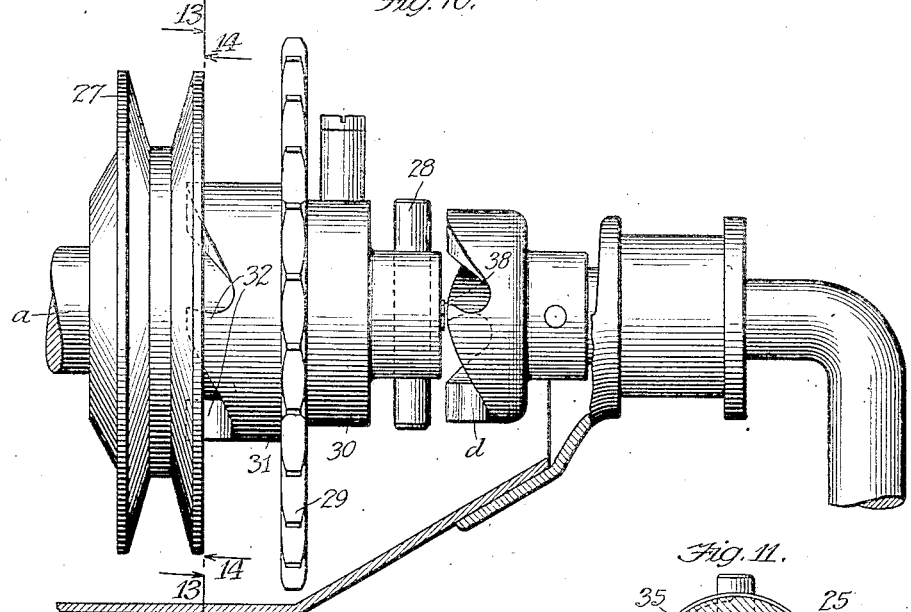
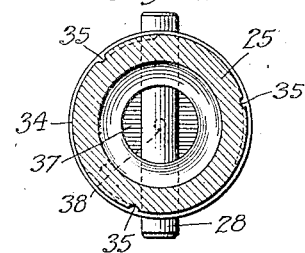
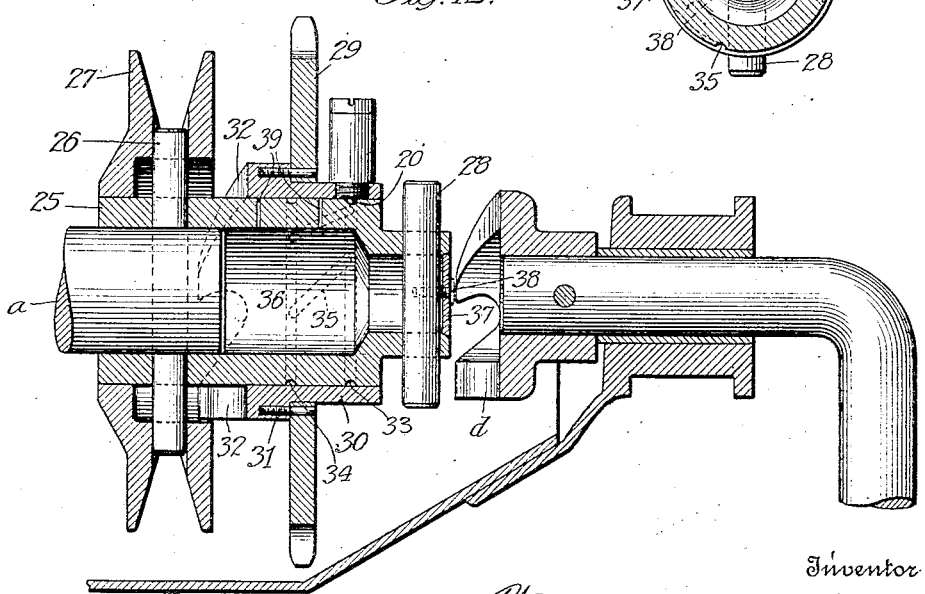

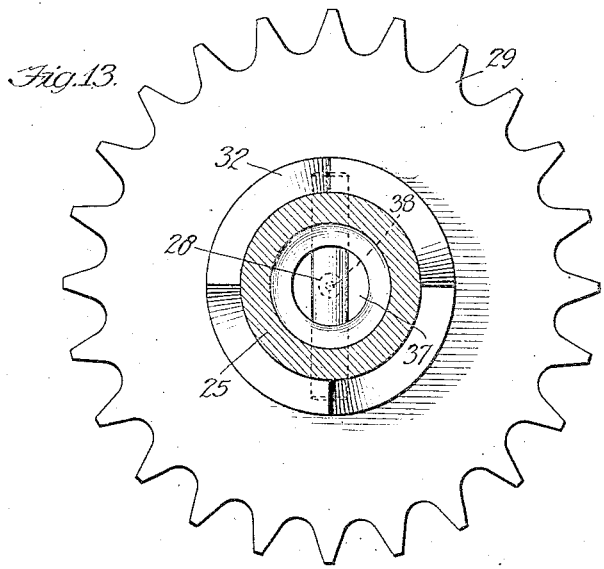
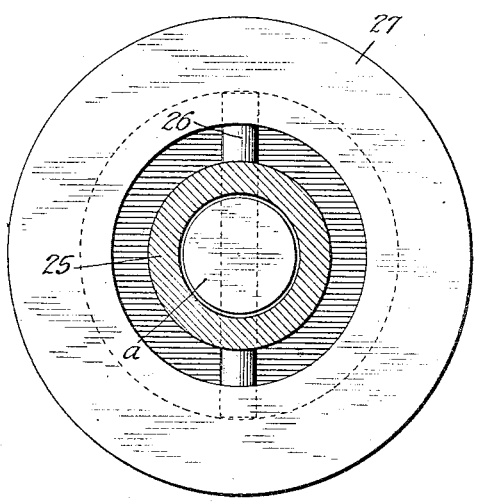
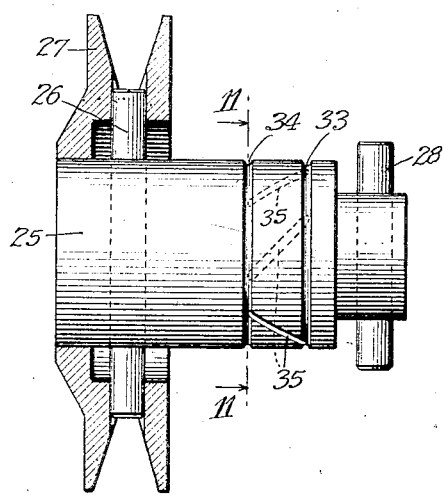

UNITED STATES PATENT OFFICE.

WILLIAM L. McGRATH, OF ELMIRA, NEW YORK, ASSIGNOR TO ECLIPSE MACHINE COMPANY, OF ELMIRA, NEW YORK, A CORPORATION OF NEW YORK.

ENGINE-STARTER.

1,288,086.  Specification of Letters Patent.  Patented Dec. 17, 1918.

Application filed August 22, 1917. Serial No. 187,824.

*To all whom it may concern:*

Be it known that I, WILLIAM L. McGRATH, a citizen of the United States, residing at Elmira, in the county of Chemung and State of New York, have invented certain new and useful Improvements in Engine-Starters, of which the following is a specification.

My invention relates to engine starters and the object thereof is to provide a simple, efficient and reliable construction of starter capable of working in connection with either a starting motor alone or both a starting motor and a generator. My starter is also so constructed and designed as to be readily applied to internal combustion engines of standard manufacture or those now extensively in use.

In the drawings Figure 1 is a plan view of my engine starter shown applied to an automobile engine, a portion of which engine is also shown but omitting the fan to more clearly show the parts below; Fig. 1ª a detail view of a yielding drive for the starting motor sprocket; Fig. 2 a front elevation of the parts of Fig. 1; Fig. 3 an elevation of the drive portion or transmission of the starter device; Fig. 4 a sectional elevation of the parts shown in Fig. 3; Figs. 5 to 8 sections on corresponding section lines of Fig. 4; Fig. 9 a section on the line 9—9 of Fig. 5; Fig. 9ª a detail view of the spring pressed pin or plunger; Fig. 10 an elevation of a modified form of construction; Fig. 11 a section on the line 11—11 of Fig. 15; Fig. 12 a central section of the parts shown in Fig. 10; Figs. 13 and 14 sections on the lines as correspondingly indicated in Fig. 10; and Fig. 15 an elevation of the sleeve shown in section in Fig. 12, with the pulley in section.

Referring to the embodiment of my invention as herein shown in Figs. 1 to 9, the internal combustion engine is indicated at A, the electric starting motor at B and the generator at C, such motor and generator being by preference suitably mounted upon the engine frame. The engine is provided with the usual crank shaft $a$ projecting forwardly of the front plate A' of the engine. Notwithstanding the installation of my power starting device the usual starting crank D with its clutch jaw $d$ adapted to engage the crank shaft for cranking the motor or engine by hand, is retained.

Referring more particularly to Figs. 3 and 4, my driving device comprises the following parts: To a suitable supporting member which is here the front plate A' of the engine, there is secured as by means of the stud 1 a flanged plate 2 forming an outstanding bearing 2ª, receiving the inwardly extending hub 3 of a wheel which, as to the drive itself, may be considered the driving wheel and which, as shown and by preference, is a sprocket wheel 4.

Preferably the sprocket wheel and its hub are made in two parts, being secured together by the rivets 5 passing through the sprocket wheel and the flange 3ª of the hub portion. The outer face of this hub flange is provided with or formed as a clutch face by having a series of clutch jaws 6 with shoulders for driving in one direction by engagement with a complementary clutch face or jaw hereinafter described. This hub flange and its clutch face forms one member of a clutch which is normally in disengaged or inoperative position as shown in Fig. 3.

Within the sprocket hub, axially thereof, is a sleeve 7 which is secured in suitable manner as by means of the cross pin 8 to the crank shaft $a$ of the engine. This pin is held in place in suitable manner, but I prefer the means shown in detail in Figs. 4 and 5, consisting of short pins 9, passing transversely through the pin 8 on opposite sides of the crank shaft and through the sleeve 7. This sleeve 7 extends forwardly of the outer end of the crank shaft and is provided near its outer end with a cross pin 10, which is adapted to be engaged by the clutch jaw $d$ when cranking by hand. This pin 10 is held in place in suitable manner as by means of the small cross pins 11, Figs. 4 and 8.

The large pin 10 serves as a means for securing to the sleeve 7 a wheel which is here shown and is by preference a pulley wheel 12 over which travels the belt 13. In the present instance being described, this belt drives the generator C by means of its pulley $c$ and the fan, indicated at E, by means of the pulley $e$, but it will be understood that this driving of either the fan or generator, or both, through the drive about to be described in detail, may be dispensed with and the drive utilized only for engine starter purposes. In that case, the pulley wheel is not necessary.

An outer or clutch sleeve 14 fits over the sleeve 7 and is provided at its outer end with a flange portion bearing against the inner side of the pulley. Springs 15 seated in sockets in the pulley wheel and said flange portion serve to hold the latter inwardly, that is, longitudinally toward the left (Fig. 4), so that the pin 8 bottoms in the slot of this sleeve. This construction permits of manufacturing tolerances without the usual resultant looseness which would cause vibration and noise, but on the contrary prevents or damps any possible vibration or noise. This outer sleeve is adapted to be detachably connected with the inner sleeve 7 for readily assembling and disassembling. As herein shown the sleeve 14 is provided with two diametrically opposite slots 14ª entering from the inner end of the hub and adapted to receive the ends of the pin 8. The springs 15 act to hold the outer sleeve inwardly to full extent so that the bottom of the slots will contact the pin 8 and receive the full bearing thereat. This pulley wheel and outer sleeve might be made in one piece so far as functioning is concerned, but are preferably made separate to give the seating action described onto the pin, and also because the wheel is made of cast iron and the sleeve of steel.

The flange portion 14ᵇ, has on its inner side a clutch face or series of jaws 16 complementary to the jaws 6, the two sets of jaws forming members of the automatically acting clutch herein before referred to. The clutch jaws 16 may be made separate from or integral with such hub flange. These jaws 6 and 16 are not right angled with respect to the flanges but, by preference, are undercut so that when engaged at their outer ends, they will have a tendency to draw together in full clutching position.

The sprocket wheel hub 3 is capable both of rotary movement within the bearing 2ª and also of a longitudinal or axial movement therein. Means are provided for enforcing such longitudinal movement automatically as a result of the rotation of the sprocket wheel 4. As herein shown such means consist of a spring-pressed pin operating in said bearing and adapted to coöperate with grooves and cross grooves in the periphery of the sprocket hub. As shown in detail in Fig. 9 this hub is provided with two parallel peripheral grooves 17 and 18, the outer one 17 of which is continuous and the other 18 which by preference is non-continuous, being divided in as many sections as there are inclined cross or communicating grooves 19 between the two peripheral grooves. The pin 20 works in a cylinder 21 which is shown screw-threaded through the bearing and closed by an end plug 22 also forming a bearing for the plunger. This pin is inwardly spring-pressed by means of the spring 23 which projects the inner end of the pin against the sprocket hub and into coöperation with said grooves. Normally, the sprocket hub is positioned within its bearing as shown in Fig. 9, but when the sprocket wheel is rotated by means of the starting motor the pin which is now resting in one of the sections of the groove 18 will enter one of the cross grooves 19, and as the pin is stationarily fixed except as to its longitudinal movement, the continued rotation of the hub will cause such hub to move longitudinally outwardly, that is to the right in Fig. 9 until such pin enters the other groove 17. This longitudinal movement brings the movable clutch face or jaws 6 into clutching engagement with the clutch face or jaws 16, with the result that the rotary movement of the sprocket wheel will be transmitted to the crank shaft $a$ through the sleeve 14, and pin 8. The described mounting of the sprocket wheel 4 and its hub gives the advantage of removing the starting strain from the crank shaft and putting it onto the stationary supporting member.

When the engine starts on its own power with speed in excess of that which was thus transmitted thereto, the clutch jaws will be automatically separated by the cam action of their adjacent inclined faces, and the sprocket wheel and its hub will be restored to normal longitudinal position. In this disengaging action, the pin 20 does not necessarily follow the cross grooves but, in effect jumps directly across from one circumferential groove to the other. The crank shaft being now driven by the engine itself, power will be transmitted from such engine through the inner sleeve 7 and pulley 12 to the generator and the fan. In case of back fire, the clutch jaws will be automatically separated by reverse rotation, the action being similar to that previously described. The relative distance between the peripheral grooves and depth of clutch jaw together with width of groove and diameter of pin are such that when the clutch is disengaged in the manner just described the pin 20 will be at the outer rounded edge of the groove 17 and the pressure thereon will force it into the groove, thereby still further separating the clutch jaws to give proper allowance and holding them apart, regardless of any vibratory effect until the next starting operation.

While the means shown for automatically and longitudinally moving the sprocket wheel and its hub, operates successfully in practice, yet I prefer to provide means for assisting in this automatic movement. As shown in Fig. 1 the starting motor B has a small driving sprocket wheel $b$ operatively connected with the driven sprocket wheel 4 by the sprocket chain 24. As shown in Fig. 1 these two sprocket wheels are in disalinement when the sprocket wheel 4 is in its normal or inoperative position, but are in alinement when the latter is in its longitudinally shifted or operative position, doing its driving work. When the motor is started and the sprocket wheels thereby rotated, there is a tendency of the sprocket chain to pull the driven sprocket wheel 4 over into alinement with the driving sprocket wheel $b$. A flexible driving connection which includes the chain is not essential, as the same action can be produced by a spiral gear drive. When the described undercut clutch jaws are used, a less degree of disalinement of driving chain may be employed, it being necessary only to bring the clutch members into partial engagement, whereupon they will automatically come into full engagement.

The hub 3 while concentric of the sleeves 7 and 14 is separated therefrom by an annular space and consequently they have no bearing on each other and such hub is entirely free therefrom when the clutch is disengaged. Thus, when the engine is running on its own power, there is no constantly running bearing in the drive device.

In Figs. 10 to 15 I have shown a modified form of construction but embodying the same general principles of construction and mode of operation. According to this construction the crank shaft $a$ is provided with a sleeve 25 to which is secured in suitable manner as by means of the large pin 26 the pulley wheel 27 similar to the wheel 12 of the other construction. This sleeve is provided at its outer end with a pin 28 adapted to be engaged by the clutch jaw $d$ of the hand crank.

Upon the sleeve 25 is mounted for both rotary and longitudinal movement a sprocket wheel 29 having a hub 30 preferably formed separate from the wheel and secured thereto in suitable manner as by means of the studs 31. This sprocket hub is provided on its inner face or has such face formed as a clutch jaw 32, which is adapted to engage the pin 26 when moved inwardly to engaging position, with the result that such sprocket wheel is adapted to drive the pulley wheel 27 and the crank shaft $a$ in one direction only.

The sprocket wheel and its hub are adapted to be moved longitudinally automatically, that is axially with respect to itself and the sleeve 25. Means somewhat similar to those hereinbefore described are provided for this purpose. However, in this instance the two peripheral grooves 33 and 34 are both continuous, and are connected by the inclined cross grooves 35. The spring-pressed pin 20 is exactly the same as that already described but in this instance is mounted on the rotatable element. In order to cause operative action of this pin the cross grooves are of differential or greater depth than the circumferential grooves, with the result that the pin will follow a cross groove when presented thereto instead of following the circumferential groove.

In this modified construction, there is a constantly rotating bearing when the engine is running, inasmuch as the sprocket wheel 29 and its hub are mounted on the sleeve 25 and are stationary when such sleeve is rotating under the driving action of the engine. To lubricate this bearing, the interior of the sleeve 25 extending beyond the end of the crank shaft is formed as a chamber 36, to contain the lubricant, by closing the outer end of such sleeve in suitable manner as by means of a plate 37, which is secured in place by a screw 38 entering the pin 28 and serving to hold the latter in place. Holes 39 deliver the lubricant to the bearing.

If desired, a yielding driving connection may be interposed somewhere in the train of driving connections between the starting motor and the crank shaft. In the present instance such yielding driving connection is shown associated with the sprocket wheel $b$. As shown in Fig. 1ª the armature shaft $b'$ passes loosely through the sprocket and is connected to a driving head or collar 40 which is connected with the sprocket by a coiled driving spring 41.

I do not herein claim the specific construction of the modified form illustrated in Figs. 10-15 but have made the same the subject matter of another application filed October 17, 1917, Serial Number 197,169.

I claim:

1. In combination with a rotatable member of the engine to be started, a rotatable and axially movable wheel arranged concentric thereof and provided with a clutch means, a second clutch means connected with said member and arranged in the path of movement of the first named clutch means, and means for automatically moving the driving wheel to bring said two clutch means into engagement.

2. In combination with a rotatable member of the engine to be started, a driving wheel arranged concentric of such member, a driven member arranged concentric of the engine member and connected with such member, and means for automatically moving the driving wheel into engagement with the driven member.

3. In combination with a rotatable member of the engine to be started, a driving wheel arranged concentric of such member, a driven member arranged concentric thereof and of the engine member and operatively connected with such latter member, said wheel and driven member having complementary clutch faces, and means for automatically moving the driving wheel axially to cause engagement of said clutch faces.

4. In combination with a rotatable member of the engine to be started, a driving wheel arranged concentric of such member, a driven member having a sleeve arranged concentric thereof and of the engine member and operatively connected with the latter member, and means for automatically moving the driving wheel into engagement with the driven member.

5. In combination with a rotatable member of the engine to be started, a driving wheel having a hub concentric with such member and provided with a clutch face, a driven clutch sleeve connected with such member and concentric with said hub, and means for automatically moving the driving wheel and clutch face axially into operative engagement with said clutch sleeve.

6. In combination with a rotatable member of the engine to be started, a driving wheel having a hub concentric with such member and provided at one end with a clutch face, and a sleeve concentric of the hub and connected with the engine member, such sleeve having an end flange provided on its inner side with a clutch face complementary with the other clutch face, said hub being mounted for rotary and axial movement, the clutch faces being brought together in such axial movement.

7. In combination with a rotatable member of the engine to be started, a fixed bearing concentric of the engine member, a driving wheel having a hub coöperating with such bearing for both rotary and axial movement and also arranged concentric of the engine member, said wheel having a clutch face, and a sleeve arranged concentrically within the hub and its bearing and connected with the engine member, said sleeve having a clutch face adapted to coöperate with the other clutch face.

8. In combination with a rotatable member of the engine to be started, a fixed bearing concentric of the engine member, a driving wheel having a hub coöperating with such bearing for both rotary and axial movement and also arranged concentric of the engine member, said wheel having a clutch face, and a sleeve arranged concentrically within the hub and its bearing and connected with the engine member, said sleeve being out of bearing contact with said hub and its bearing and having a clutch face adapted to coöperate with the other clutch face.

9. In combination with a shaft of the engine to be started, a bearing member, a driving member supported thereby for rotary and axial movement and having a clutch face, means associated with such members for automatically moving the driving member axially when it is rotated, and a clutch sleeve arranged concentrically within the driving member and connected with the engine shaft, such sleeve coöperating with said clutch face.

10. In combination with a shaft of the engine to be started, a bearing member, a driving member supported thereby for rotary and axial movement and having a clutch face, means associated with such members for automatically moving the driving member axially when it is rotated consisting of a yielding pin in one member and grooves in the other member coöperating with such pin, and a clutch sleeve arranged concentrically within the driving member and connected with the engine shaft, such sleeve coöperating with said clutch face.

11. In combination with a rotatable member of the engine to be started, a rotatable driving wheel having a hub concentric of said member and movable axially, a sleeve connected with said member, and a clutch sleeve connected with the engine member, such clutch sleeve and hub having complementary clutch faces.

12. In combination with a rotatable member of the engine to be started, a rotatable driving wheel having a hub concentric of said member and movable axially, a sleeve connected with said member, a clutch sleeve connected with the engine member, such clutch sleeve and hub having complementary clutch faces, and means for automatically moving the driving wheel axially and thereby causing clutch engagement.

13. In combination with a rotatable member of the engine to be started, a driving wheel having a hub concentric of said member and movable axially, a sleeve secured to said member, a second sleeve fitting upon the first sleeve and also secured to said member, such second sleeve and hub having complementary clutch faces.

14. In combination with a rotatable member of the engine to be started, a driving wheel having a hub concentric of said member and movable axially, a sleeve secured to said member, a second sleeve fitting upon the first sleeve and also secured to said member, such second sleeve and hub having complementary clutch faces, and means for automatically moving said driving wheel axially and thereby causing clutch engagement.

15. In combination with a rotatable member of the engine to be started, a rotatable driving wheel having a hub concentric of said member and movable axially, a sleeve connected with said member, a driven wheel secured thereto, a clutch sleeve connected with the engine member, such clutch sleeve and hub having complementary clutch faces, and yielding means tending to hold the driven wheel and clutch sleeve separated.

16. In combination with a rotatable member of the engine to be started, a rotatable driving wheel having a hub concentric of said member and movable axially, a sleeve connected with said member, a driven wheel secured thereto, a clutch sleeve connected with the engine member, such clutch sleeve and hub having complementary clutch faces, and springs interposed between the driven wheel and clutch sleeve tending to hold them separated.

17. The combination of a shaft of the engine to be started, provided with a projection, a driving wheel having a hub concentric of said shaft and movable axially, said hub having a clutch face, a sleeve secured to said shaft through such projection, a clutch sleeve fitting over the first sleeve and coöperating with the clutch face, said clutch sleeve having a slot to receive the projection, a driven wheel secured to the first sleeve, and means between the driven wheel and clutch sleeve tending to hold the latter in full engagement with said projection.

18. The combination of a shaft of the engine to be started, provided with a projection, a driving wheel having a hub concentric of said shaft and movable axially, said hub having a clutch face, a sleeve secured to said shaft through such projection, a clutch sleeve fitting over the first sleeve and coöperating with the clutch face, said clutch sleeve having a slot to receive the projection, a driven wheel secured to the first sleeve, and springs interposed between the driven wheel and clutch sleeve tending to hold the latter in full engagement with said projection.

19. In combination with a rotatable member of the engine to be started, a driving wheel having a hub concentric of said member and movable axially, a clutch sleeve secured to said member by detaching means including a cross pin in such engine member, the sleeve being slotted to receive a pin, and a driven wheel having a hub detachably secured to said engine member through said pin, said hub and clutch sleeve having complementary clutch faces.

20. In combination with a rotatable member of the engine to be started, a driving wheel having a hub concentric of said member and movable axially, a sleeve secured to said member by detaching means including a cross pin in such engine member, small fastening pins passing through said pin and sleeve, a clutch sleeve fitting upon the first sleeve and slotted to receive the pin, a driven wheel detachably secured to the first sleeve, said hub and clutch sleeve having complementary clutch faces.

21. In combination with a rotatable member of the engine to be started, a driving wheel having a hub concentric of said member and movable axially, a sleeve secured to said member, and having at its outer end a means to be engaged by a hand crank, a clutch sleeve fitting upon the first sleeve and also secured to the engine member, said hub and clutch sleeve having complementary clutch faces.

22. In combination with a rotatable member of the engine to be started, a driving wheel having a hub concentric of said member and movable axially, a sleeve secured to said member, and having at its outer end a cross pin to be engaged by a hand crank, a clutch sleeve fitting upon the first sleeve and also secured to the engine member, said hub and clutch sleeve having complementary clutch faces.

23. In combination with a rotatable shaft of the engine to be started, a driving wheel having a hub concentric with the shaft and provided with a clutch face, said wheel and hub being mounted for rotary and axial movement, and a clutch member secured to the shaft and coöperating with said clutch faces, said driving wheel and hub being free of bearing contact when the shaft is running on its own power.

24. In combination with a shaft of the engine to be started, a bearing member, a driving member supported thereby for rotary and axial movement and having a clutch face, a clutch sleeve secured to the shaft and coöperating with the clutch face, and means for automatically moving the driving member axially to cause clutch engagement consisting of a yielding pin in one of the members, and two circumferential grooves in the other member, said grooves being connected by inclined cross grooves and one of the circumferential grooves being interrupted at intervals, and said pin coöperating with said grooves.

25. In combination with a rotatable member of the engine to be started, a driving wheel having a hub mounted for rotary and axial movement and having a clutch face, a clutch sleeve secured to the engine member and coöperating with the clutch face, and means for automatically so moving said wheel axially consisting of a pin and two circumferential grooves in the hub and inclined cross grooves connecting them, one of the grooves being interrupted at intervals, and said pin coöperating with said grooves.

26. In combination with a rotatable member of the engine to be started, a driving wheel having a hub mounted for rotary and axial movement and having a clutch face, a clutch sleeve secured to the engine member and coöperating with the clutch face, and means for automatically so moving said wheel axially consisting of a pin and two circumferential grooves in the hub and inclined cross grooves connecting them, one of the circumferential grooves being so relatively located with respect to the clutch face that when such face is initially disengaged from the clutch sleeve by reverse or withdrawal movement of the hub said pin will be at the edge of said particular groove and will be forced thereinto to further withdraw the hub and provide clearance at the clutch faces.

27. In combination with a rotatable member of the engine to be started, a driving wheel having a hub concentric of said member and movable axially, said hub having a clutch face, a sleeve secured to said member and having at its outer end a cross pin to be engaged by a hand crank, a driven wheel detachably secured to said sleeve by said pin, and a clutch sleeve coöperating with such clutch face and also secured to the engine member.

28. In combination with an engine shaft, a supporting bearing, a driving wheel having a hub arranged within said bearing and having both a rotary and longitudinal axial movement therein, a clutch sleeve also secured to the shaft and coöperating with said hub, said clutch sleeve extending within the hub but out of contact therewith.

29. In combination with an engine shaft, a supporting bearing, a driving wheel having a hub arranged within said bearing and having both a rotary and axial movement therein, a clutch sleeve secured to the shaft and coöperating with the hub within which it extends but from which it is separated by an annular space, and a second sleeve secured to the shaft and arranged within the clutch sleeve, the driven wheel being mounted on the second sleeve.

30. In combination with a rotatable shaft of the engine to be started, a driving wheel mounted concentric of the shaft and movable axially, a clutch sleeve secured to the shaft and coöperating with the driving wheel for driving purposes, a driven wheel and a sleeve secured to and extending beyond the end of the shaft, said second wheel being secured to the latter sleeve.

31. In combination with a rotatable shaft of the engine to be started, a driving wheel mounted concentric of the shaft and movable axially, a clutch sleeve secured to the shaft and coöperating with the driving wheel, a sleeve secured to and extending beyond the end of the shaft, and a projection on the extended end of the sleeve for engagement by a hand crank.

32. In combination with a rotatable shaft of the engine to be started, a driving wheel mounted concentric of the shaft and movable axially, a clutch sleeve secured to the shaft and coöperating with the driving wheel, a driven wheel, a sleeve secured to and extending beyond the end of the shaft, and a cross pin in such sleeve for securing the second wheel thereto and for engagement by a hand crank.

33. In combination with a rotatable member of the engine to be started, a driving wheel having a hub concentric with such member and provided with a clutch face, a driven clutch sleeve connected with such member and concentric with said hub, and means for automatically moving the driving wheel and clutch face axially into operative engagement with said clutch sleeve, a prime mover, and a yielding driving connection arranged between said prime mover and the engine member.

34. In combination with a rotatable member of the engine to be started, a driving wheel having a hub concentric with such member and provided with a clutch face, a driven clutch sleeve connected with such member and concentric with said hub, and means for automatically moving the driving wheel and clutch face axially into operative engagement with said clutch sleeve, a prime mover, an initial driving wheel operatively connected with said first named driving wheel, and a yielding driving connection between the prime mover and the said initial driving wheel.

35. In combination with a rotatable member of the engine to be started, a driving wheel having a hub concentric with such member and provided with a clutch face, a driven clutch sleeve connected with such member and concentric with said hub, and means for automatically moving the driving wheel and clutch face axially into operative engagement with said clutch sleeve, a prime mover, an initial driving wheel operatively connected with said first named driving wheel, and a spring drive between the prime mover and the said initial driving wheel.

36. An engine starter drive including a pair of clutch members, the first of which is connected with the engine to be started, and the second of which is movable into and out of engagement with the first member, a driving wheel, a driven wheel driven thereby the latter wheel being connected with said second clutch member and being out of alinement with the driving wheel when such second member is in unclutched position, and a flexible driving connection between said two wheels which tends to draw the wheels into alinement when operating.

37. In combination with a rotatable member of the engine to be started, a driven wheel arranged concentric of such member and having a clutch member, a second clutch member secured to the engine member and coöperating with the first clutch member, a main driving wheel for driving the driven wheel, the latter wheel being out of alinement with the main driving wheel when such second member is in unclutched position, and a driving connection between the main driving wheel and the driven wheel which tends to draw such wheels into alinement when operating.

38. In combination with a rotatable member of the engine to be started, a driving wheel, a driven wheel arranged concentric of such member and carrying a clutch member, a second clutch member secured to the engine member, said wheels being in disalinement when the clutch members are inoperative, and a driving connection between said two wheels, whereby the wheels are brought automatically into alinement when rotated.

39. In combination with a rotatable member of the engine to be started, a driven wheel having a clutch face and axially movable, a clutch sleeve connected with the engine member and coöperating with the first clutch face, means associated with the driven wheel for automatically moving it axially, a driving wheel in disalinement with the driven wheel, and a driving transmission between the two wheels, the disalinement tending to move the driven wheel axially into engagement with the clutch sleeve.

40. In combination with a rotatable shaft of the engine to be started, a rotatable driven wheel adapted to move axially and having a clutch face consisting of undercut teeth, a second clutch face connected with the shaft and having complementary teeth, means associated with the driven wheel for automatically moving it axially, a driving wheel in disalinement with the driven wheel, and a driving transmission between the two wheels, the disalinement tending to move the driven wheel into engagement with the second clutch face.

41. An engine starter drive including a pair of clutch members, the first of which is connected with the engine to be started and the second of which is movable into and out of engagement with the first member, a driving wheel, a wheel driven thereby and connected with said second clutch member, said wheels being out of alinement with the driving wheel when such second member is in unclutched position and in alinement when in clutched position, and a flexible driving connection between said two wheels which tends to draw them into alinement when operating.

42. An engine starter drive including a pair of clutch members, the first of which is connected with the engine to be started and the second of which is movable into and out of engagement with the first member, a driving sprocket wheel, a sprocket wheel driven thereby and connected with said second clutch member, said wheel being out of alinement with the driving wheel when such second member is in unclutched position and in alinement when in clutched position, and a sprocket chain between said two wheels which tends to draw them into alinement when operating.

WILLIAM L. McGRATH.